United States Patent Office 3,516,427
Patented June 23, 1970

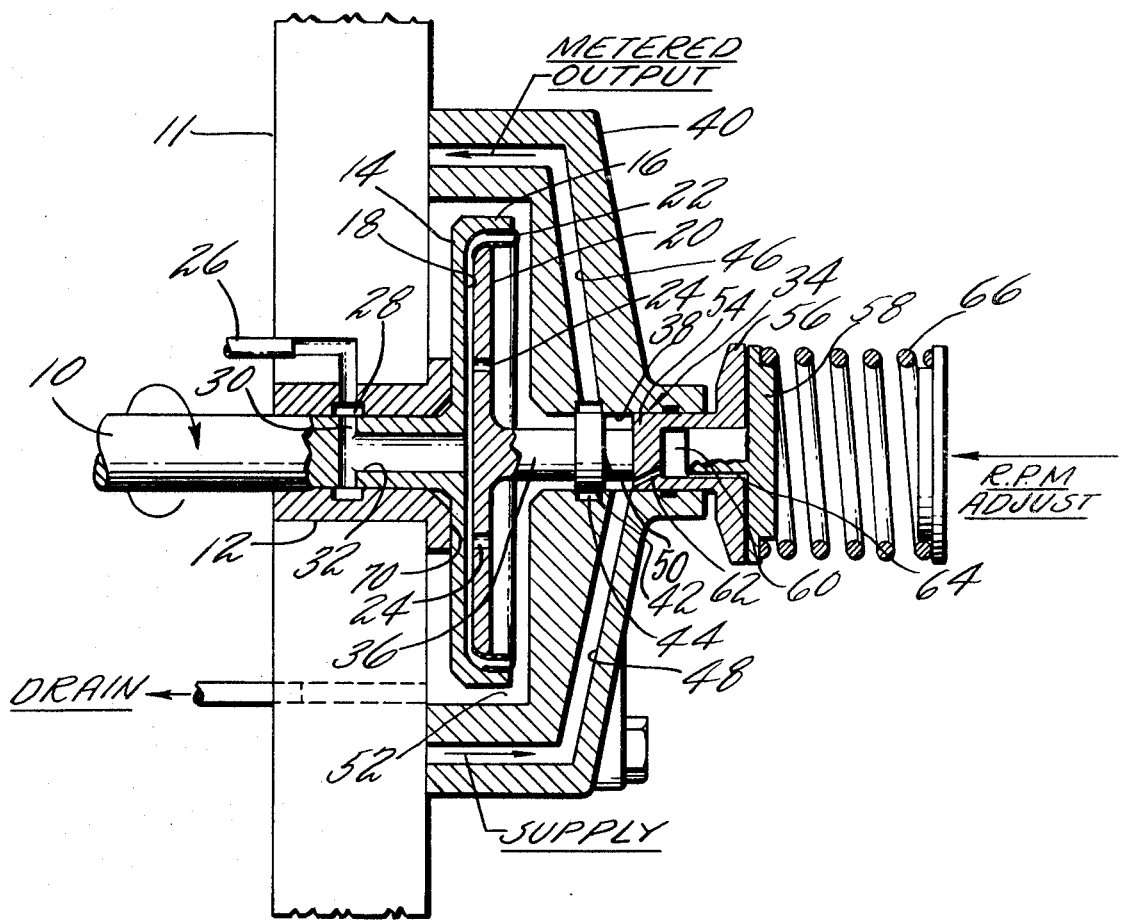

3,516,427
FLUID GOVERNOR
Philip Earle Barnes, North Granby, Conn., assignor to United Aircraft Corporation, East Hartford, Conn., a corporation of Delaware
Filed Mar. 13, 1968, Ser. No. 712,673
Int. Cl. G05d 13/00
U.S. Cl. 137—47                                   7 Claims

ABSTRACT OF THE DISCLOSURE

A fluid reaction chamber having one wall formed by the end of a control valve is coupled to a rotating device whose speed is intended to be measured and develops an axial force on the wall in proportion to the speed thereof. An adjustable spring acting on the opposite end of the control valve develops a force proportional to the height of the spring and opposes the force created in the chamber whereby the difference between the forces adjusts the control valve to produce an output signal.

BACKGROUND OF THE INVENTION

This invention relates to speed governors and more particularly to the type that utilizes hydraulic fluid.

The purpose of this invention is to minimize the size, weight and complexity of speed governors while improving their reliability. The typical governor utilizes a solid mass such as a flyweight or spherical balls which are generally spaced about the rotating axis so as to be positioned radially toward or away from said axis for producing a force which is proportional to the square of the r.p.m. This force is then transmitted through mechanical linkages or mechanisms to balance the force of a speeder spring. This invention contemplates the elimination of the solid mass and the attendant force transmitting element by incorporating a fluid reaction chamber which directly opposes the force of the speeder spring.

SUMMARY OF THE INVENTION

A primary object of this invention is to provide an improved speed governor.

A still further object of this invention is to provide a fluid governor which eliminates flyweights and linkages for producing a force proportional to the speed of rotation of the rotating pressure reaction chamber.

A still further object of this invention is to provide in a governor as described a fluid reaction chamber having a movable valve disc defining one wall thereof for translating a force to a speeder spring as a function of the speed of rotation of said chamber.

Hydrodynamic thrust bearings are utilized so as to permit increased speed of rotation of the rotating chamber in place of conventional antifriction ball bearings.

A still further object is to provide a hydraulic governor which is characterized as being smaller in size, lighter in weight, and simple to manufacture.

Other features and advantages will be apparent from the specification and claims and from the accompanying drawings which illustrate an embodiment of the invention.

BRIEF DESCRIPTION OF THE DRAWING

The sole figure is a view partly in side elevation, partly in schematic and partly in sectional illustrating the preferred embodiment of this invention.

DESCRIPTION OF THE PREFERRED EMBODIMENT

Referring to the figure, a drive shaft 10 is coupled in any suitable manner to mechanism whose speed is intended to be sensed and is supported in housing 11 by bearing 12 and carries a radially extending flange 14. The outer periphery 16 of flange 14 is bent and extends axially to define chamber 18. Valve disc 20 whose outer diameter is slightly less than the diameter of the chamber fits therein to form a closure wall of chamber 18. Chamber 18 is sealed by flexible diaphragm 22 suitably bonded to the walls of flange 16 and valve disc 20 so that the chamber is completely sealed save for apertures 24. Pressurized fluid is admitted into chamber 18 through line 26 through annulus 28 formed in bearing 12 and drilled passages 30 and 32. Obviously excess fluid in chamber 18 spills out through apertures 24 so as to maintain a desired level of fluid.

Control valve generally illustrated by reference numeral 34 consists of spool 36 axially extending in bore 38 formed in casing 40. Land 42 carried by spool 36 cooperates with port 44 to lead fluid to or bleed fluid from drilled passage 46. It is apparent from the foregoing that pressurized fluid in drilled passage 48 admitted to annulus 50 will flow to drilled passage 46 when land 42 is displaced leftwardly. Movement of land 42 relative to port 44 to the right will bleed fluid from drilled passage 46 to drain cavity 52.

The end of bore 38 is sealed by increased diameter portion 54 of spool 36.

As noted from the figure the end of spool 36 projects beyond casing 40 and carries radially extending flange 56. The face of flange 56 compliments the inner face of spring retainer 58 journaled in recess 60 formed in the end of spool 36. Spring retainer 58 is suitably restrained from rotary motion by any well known means.

Fluid from passage 48 is admitted into recess 60 through annulus 50, drilled passage 62, axial slot 64 and forced to the gap between the complementary faces of flange 56 and spring retainer 58. This serves as a hydrostatic/hydrodynamic thrust bearing.

A conventional speeder spring 66 engages one end of spring retainer 58 and is adjustable to provide a force to valve disc 20 transmitted through spool 36.

The thrust load created by the speeder spring load is taken by the bearing defined by the radially extending flange 70 formed on the end of bearing 12.

Now that the details of the invention have been described, the next portion will describe the operation thereof. Centrifugal force will force fluid in chamber 18 to the outer periphery to a level adjacent the apertures 24. The radial pressure caused by the rotation of chamber 18 is also the axial pressure of equal magnitude which is a function of r.p.m.² opposing the force created by speeder spring 66. When these forces are equal, land 42 will register with port 44.

When the axial load is greater than the speeder spring load attendant an overspeed condition, land 42 will be translated to the right for bleeding drilled passage 46, realizing, of course, that drilled passage 46 is in communication with some actuator used in adjusting the rotational speed of the device governed by the speed governor.

Obviously, in an underspeed condition the speeder spring force displaces land 42 to the left admitting supply pressure to drilled passage 46 and eventually the actuator (not shown).

It should be understood that the invention is not limited to the particular embodiments shown and described herein, but that various changes and modifications may be made without departing from the spirit and scope of this novel concept.

What I claim as new and desire to secure by Letters Patent of the United States is:

1. A speed governor comprising, in combination, (a) a rotary member rotatable about an axis of rotation coupled to a rotating member whose speed is to be governed,
(b) a fluid receiving chamber radially extending from said axis of rotation,
(c) an axially movable member forming a wall of said chamber,
(d) adjustable resilient means imparting a force on said wall,
(e) means imparting centrifugal force to the fluid in said chamber to impart a force on said wall in opposition to the force created by said adjustable resilient means,
(f) means responsive to the difference of the forces imparted to said wall,
(g) a housing defining a cavity, said wall being disposed in said cavity, said rotary member carrying a flange element in said cavity and being juxtaposed to said wall,
(h) sealing means between said wall and said flange element, and
(i) an aperture in said wall defining a vent for said fluid to maintain it at a predetermined level.

2. A speed governor as claimed in claim 1 wherein said sealing means is a diaphragm.

3. A speed governor as claimed in claim 1 wherein said means responsive to the difference of the forces includes a valve means, a source of pressure and a drain, said valve means communicating with either said source or said drain when there is a difference in said forces.

4. A speed governor as claimed in claim 1 wherein said adjustable resilient means includes a speeder spring.

5. A speed governor as claimed in claim 4 wherein said speeder spring is a helically wound spring.

6. A speed governor comprising in combination
(a) a casing having a cavity portion,
(b) a rotary member having a radially extending flange in said cavity portion rotatable about an axis of rotation coupled to a rotating member whose speed is to be governed,
(c) said flange having at its outer periphery an axially extending portion defining an open-ended pocket,
(d) an axially movable disc-like member in said pocket extending adjacent said axially extending portion,
(e) a flexible annular member interconnecting said axially extending portion and said disc-like member so that said pocket is substantially closed,
(f) means for admitting fluid to said pocket and maintaining the level of fluid therein at a predetermined value,
(g) adjustable resilient means imparting an axial force on said disc-like member,
(h) means imparting centrifugal force to the fluid in said pocket to impart a force on said disc-like member in opposition to the force created by said adjustable resilient means, and
(i) means responsive to the difference of the forces imparted to said disc-like member.

7. A speed governor as claimed in claim 6 including a connection member having one end connected to said disc-like members and an opposing end extending through said casing, said connection member having a flange at the said opposing end,
a retainer member adjacent said flange,
said retainer member and said flange having complementary planar surfaces in juxtaposed relation, and
means for continuously leading fluid between said planar surfaces.

References Cited

UNITED STATES PATENTS

| | | | |
|---|---|---|---|
| 1,392,890 | 10/1921 | Fulton | 73—523 X |
| 2,567,753 | 9/1951 | Alfaro | 137—37 |
| 2,642,275 | 6/1953 | Sollinger | 137—47 X |
| 2,873,105 | 2/1959 | Roeder | 73—523 |
| 3,035,592 | 5/1962 | Kahn | 137—54 |
| 3,308,841 | 3/1967 | Lemieux | 137—47 |

CLARENCE R. GORDON, Primary Examiner

U.S. Cl. X.R.

73—523